(12) United States Patent
Glück et al.

(10) Patent No.: US 6,297,292 B1
(45) Date of Patent: Oct. 2, 2001

(54) WATER EXPANDED POLYSTYRENE PARTICLES

(75) Inventors: Guiscard Glück, Mainz; Klaus Hahn, Kirchheim; Roland Gellert, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/646,099

(22) PCT Filed: Mar. 19, 1999

(86) PCT No.: PCT/EP99/01840

§ 371 Date: Sep. 20, 2000

§ 102(e) Date: Sep. 20, 2000

(87) PCT Pub. No.: WO99/48958

PCT Pub. Date: Sep. 30, 1999

(30) Foreign Application Priority Data

Mar. 24, 1998 (DE) .............................. 198 12 854

(51) Int. Cl.$^7$ .................. C08J 9/22; C08J 9/228
(52) U.S. Cl. .................. 521/58; 264/DIG. 9; 521/56; 521/60
(58) Field of Search .................. 521/56, 58, 60; 264/DIG. 9

(56) References Cited

U.S. PATENT DOCUMENTS

| 5,110,837 | * | 5/1992 | Harclerode et al. | 521/58 |
| 5,114,640 | * | 5/1992 | Harclerode et al. | 521/58 |

FOREIGN PATENT DOCUMENTS

9801488 * 1/1998 (WO).

* cited by examiner

*Primary Examiner*—Morton Foelak
(74) *Attorney, Agent, or Firm*—Oblon, Spivak, McClelland, Maier & Neustadt, P.C.

(57) ABSTRACT

The invention relates to a process for the preparation of expanded polystyrene particles in which polystyrene beads containing water as the sole expanding agent are expanded. The process involves the following stages:

A) the polystyrene beads are pre-expanded at temperatures above 100° C.,

B) the pre-expanded particles are dried in dry air at temperatures between 20° and 95° C. over a period of from 1 to 10 hours, C) the dried expanded particles are further expanded with steam at temperatures ranging from 100° to 140° C., and D) the stages b and c are repeated as often as is necessary to achieve the desired bulk density.

2 Claims, No Drawings

WATER EXPANDED POLYSTYRENE PARTICLES

The invention relates to a process for the preparation of expanded polystyrene particles by expanding polystyrene beads using water as the expanding agent and also to water-expanded polystyrene particles of low bulk density.

Expanded polystyrenes (EPS) are usually prepared with the assistance of organic expanding agents, for example volatile hydrocarbons, particularly pentane. For environmental reasons, the pentane emitted during preparation and processing of EPS has to be retrieved. This is an elaborate and cost-intensive procedure. Thus it is expedient to replace these organic substances in the longer term by environmentally acceptable expanding agents. One way of doing this is to use water as the expanding agent.

In a dissertation entitled "Water Expandable Polystyrenes" (WEPS) written by J. J. Crevecoeur at the University of Eindhoven in 1997, there is described a process for the preparation of expanded polystyrene particles using water as expanding agent. In this process water is first emulsified in a styrene/polystyrene mixture with the assistance of amphiphilic surfactants, after which the resulting emulsion is suspended in water and the styrene polymerized. The polystyrene beads thus formed contain very finely distributed droplets of water. However, expansion of these polystyrene beads is accompanied by a serious problem, ie, due to its low molar mass the water diffuses through the cell walls much faster than, say, pentane, so that only a relatively low degree of expansion is achieved. Even when optimal emulsifying agents are used for the preparation of the water-containing polystyrene beads and hot air having a temperature of 130° C. is used for expansion, the degree of expansion achieved is not more than 24%, which gives a bulk density of 25 g/L.

However, it is generally desirable to achieve much lower bulk densities, in order to economize on material.

It is therefore an object of the present invention to provide a process for expanding polystyrene beads containing water as the expanding agent, which makes it possible to manufacture expanded polystyrene particles having lower bulk densities.

This object is achieved by the process of the invention.

When the term "polystyrene" is used in the present patent application, this should be taken to included copolymers of styrene with up to 20 wt % of conventional comonomers, eg alkyl styrenes, acrylonitrile or α-methylstyrene, and also mixtures of polystyrene with up to 20 wt % of other polymers, such as caoutchoucs or polyphenylene ether.

The process of the invention starts from polystyrene beads containing from 2 to 20 wt %, preferably from 5 to 15 wt % and more preferably from 8 to 13 wt %, of water as the sole expanding agent. Such water-containing polystyrene beads can be prepared as described in the dissertation by Crevecoeur by polymerization of styrene in aqueous suspension to give suspended drops of styrene containing finely divided emulsified water. The resulting polystyrene beads usually exhibit an average particle size of from 0.2 to 5 mm, particularly from 0.5 to 2 mm. They preferably contain from 0.1 to 2 wt % of organic bromine compound, eg hexabromocydododecane, acting as flame retardant. The polystyrene beads are washed and freed from adhering water.

In the first process stage (a) of the invention the polystyrene beads are heated to temperatures above 100° C., preferably to from 110° to 150° C. and more preferably to from 120° to 140° C. Heating can be carded out using hot gas, preferably a stream of hot air having a temperature of approximately 130° C., in a conventional EPS pre-expander for example. This treatment advantageously takes less than 2 min. As a result, the polystyrene beads are pre-expanded by evaporation and expansion of the droplets of water. The bulk density thereof drops from originally approximately 600 g/L to from 40 to 400 g/L, preferably to from 50 to 200 g/L.

In the second stage (b) the pre-expanded particles are dried at temperatures between 20° and 95° C., preferably between 40° and 80° C. This is advantageously done with dry air, nitrogen or $CO_2$. Alternatively, the particles can be dried by treatment with brine, eg a 20 wt % strength sodium chloride solution. It is important to ensure that there is an adequate gradient of the chemical potentials of the water between the interior and exterior of the particles. The duration of treatment is from 1 to 10 hours, preferably from 2 to 8 hours. During this treatment the expanded particles are freed from residual water.

In the third stage (c) the dried expanded particles are further expanded with steam or a gas mixture containing at least 50 vol % of steam. The steam used has a temperature of from 100° to 140° C., preferably from 100° to 130° C. This can take place in conventional non-pressurized vessels or in pressurized pre-expanders and normally takes from 10 s to 5 min. As a result, the bulk density of the expanded particles is further reduced, for example by from 20 to 80%, preferably by from 40 to 60%.

The stages (b) and (c) are then repeated as often as is necessary to achieve the desired bulk density, by which means very low bulk densities can be attained.

The invention therefore further relates to expanded polystyrene particles obtained by expanding polystyrene beads containing water as the sole expanding agent and having a bulk density of less than 25 g/L, preferably less than 20 g/L and more preferably from 8 to 16 g/L.

The expanded particles can be welded together to give molded articles of expanded material, eg blocks, plates or shaped articles, by conventional methods.

EXAMPLE

Polystyrene beads containing 12 wt % of finely divided water are treated with hot air having a temperature of 130° C. over a period of 50 s, during which process the beads expand by a factor of 10 to a bulk density of 60 g/L. The prexpanded particles are subsequently treated in a stream of dry hot air having a temperature of 70° C. for a period of 6 h. They are then further expanded in a conventional pre-expanding machine using steam having a temperature of 120° C. over a period of 2 min to give a bulk density of 30 g/L. After drying and expanding with steam two more times there are obtained expanded particles having a bulk density of 10 g/L.

We claim:

1. A process for the preparation of expanded polystyrene particles by expanding polystyrene beads containing water as the sole expanding agent characterized by the following stages:

A) polystyrene beads, in which from 2 to 20 wt % of water is incorporated, are heated to temperatures above 100° C. to produce pre-expanded particles, B) the pre-expanded particles are dried at temperatures between 20° and 95° C. over a period of from 1 to 10 hours, C) the dried expanded particles are further expanded with steam or a gas mixture containing at least 50 vol % of steam at temperatures of from 100° to 140° C., and D) the stages b and c are repeated as often as is necessary to achieve the desired bulk density.

2. A process as defined in claim 1, wherein the expansion carried out in stage a) is set to give a bulk density of from 40 to 400 g/L and in stage c) the bulk density is further reduced by from 20 to 80%.

* * * * *